United States Patent
Hudson et al.

(10) Patent No.: US 11,171,481 B1
(45) Date of Patent: Nov. 9, 2021

(54) DUAL-SUPPLY AUTOMOTIVE ELECTRICAL SYSTEM WITH PROTECTION OF MOTION CONTROL COMPONENTS

(71) Applicant: FORD GLOBAL TECHNOLOGIES, LLC, Dearborn, MI (US)

(72) Inventors: Andrew Hudson, Canton, MI (US); Farouq Mozip, Dearborn, MI (US); David Celinske, Wolverine Lake, MI (US); John A. DeMarco, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/101,255

(22) Filed: Nov. 23, 2020

(51) Int. Cl.
*H02H 7/20* (2006.01)
*H02H 1/00* (2006.01)
*B60R 16/033* (2006.01)

(52) U.S. Cl.
CPC ............ *H02H 7/20* (2013.01); *B60R 16/033* (2013.01); *H02H 1/0007* (2013.01)

(58) Field of Classification Search
CPC ............ B60L 2210/00; B60L 2210/10; B60L 3/0007; B60L 3/0015; B60L 3/0023; B60L 3/0092; B60L 3/02; B60L 3/04; B60L 3/12; B60L 5/38; B60L 5/39; B60L 5/42; B60L 58/00; B60L 58/10; B60L 58/30; B60L 58/40; B60L 7/00; B60L 7/003; B60L 7/006; B60R 16/033; B60R 2021/0002; B60R 21/00; B60R 21/01; H02H 1/0007; H02H 3/202; H02H 3/36; H02H 7/20; H02H 9/04; H02H 9/045
See application file for complete search history.

(56) References Cited

U.S. PATENT DOCUMENTS 7,863,769 B2  1/2011  Busdiecker et al.
9,677,480 B2  6/2017  Carbonaro et al.
(Continued)

FOREIGN PATENT DOCUMENTS

DE   102017101369 A1 *  7/2018  ............ B60L 3/0046
WO   2016162624 A1    10/2016

OTHER PUBLICATIONS

Stephen Reinhofer, BSc., Fail-Operational Architectures for Electric Propulsion Systems, Master's Thesis—Graz University of Technology, Nov. 2015 pp. 1-70.
(Continued)

*Primary Examiner* — Jared Fureman
*Assistant Examiner* — Nicolas Bellido
(74) *Attorney, Agent, or Firm* — Frank L. Lollo; MacMillan, Sobanski & Todd, LLC (57) ABSTRACT

An automotive electrical system provides power from two DC sources each connected to a separate group of integrity-protected (ASIL) loads. A third group of non-ASIL loads are connected to both power sources through a controllable isolator with first and second transistor arrays. The connection through the isolator also connects each ASIL group to the other DC source. A control circuit includes a plurality of drivers for driving the first and second transistor arrays into conduction. The control circuit is configured to cease driving at least a respective one of the first and second transistor arrays when a fault condition is detected in which current flow in at least one of the transistor arrays exceeds a threshold.

12 Claims, 4 Drawing Sheets

(56) References Cited

U.S. PATENT DOCUMENTS

| | | |
|---|---|---|
| 10,391,886 B2 * | 8/2019 | Wortberg .............. B60L 3/0092 |
| 10,397,019 B2 | 8/2019 | Hartung et al. |
| 2011/0037317 A1 * | 2/2011 | Kuschnarew ........... B60L 50/51 |
| | | 307/9.1 |

OTHER PUBLICATIONS

Valerie Bernon-Enjalbert et al., Safety-Integrated Hardware Solutions to Support ASIL-D Applications, Freescale, 2013.
Kedar Chitnis et al., Enabling Functional Safety ASIL Compliance for Autonomous Driving Software Systems, IS&T International Symposium on Electronic Imaging 2017, Autonomous Vehicles and machines 2017.

* cited by examiner

DUAL-SUPPLY AUTOMOTIVE ELECTRICAL SYSTEM WITH PROTECTION OF MOTION CONTROL COMPONENTS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to an automotive electrical system, and, more specifically, to an isolator circuit for maintaining a high reliability of critical motion control systems.

Especially with the increasing use of autonomously-driven vehicles and drive-by-wire control systems in all types of automotive vehicles, high reliability of motion-related systems is important.

An international standard ISO 26262 defines a risk classification scheme known as Automotive Safety Integrity Level (ASIL), and defines safety compliance requirements according to hazard level. Risk levels include ASIL-A, ASIL-B, ASIL-C, and ASIL-D, where ASIL-D represents the highest threat level. Risk level is determined according to threat severity, exposure rate, and controllability. A braking system, steering system, engine management system, airbag system, and autonomous computing/sensor system may carry an ASIL-D level, for example. For each assessed risk level, various processes and a required level of risk reduction are identified for compliance. A QM (Quality Management) level is also defined which represents components which are not hazardous and which are not subject to ASIL-level requirements.

In vehicles utilizing components with corresponding ASIL requirements, there continue to be many other vehicle components at the QM level. The QM-level electrical loads may share an electrical power source (e.g., battery, alternator, or DC/DC converter) with the ASIL electrical loads. Failures in QM-level electrical loads may propagate to interconnected components, which may affect ASIL-level (i.e., A, B, C, or D) loads. One solution would be to design the QM-level components to comply with the ASIL safety levels of any connected devices. But because of a large number of legacy systems (e.g., electrical loads such as an AM/FM radio receiver, interior lighting, clocks, heated seats, video players, etc.) which are still present in autonomous and drive-by-wire vehicles, designing and manufacturing these legacy systems to the same level of robustness as the critical motion control systems is not practical.

It would be desirable to instead detect critical faults in the legacy systems that may result in motion control failure and to prevent them from propagating. It would also be desirable to allow for smooth transitions from normal operation into failure mitigating states, such as from driving at highway speeds to pulling over and stopping in a controlled manner.

SUMMARY OF THE INVENTION

An automotive electrical system provides power from two DC sources. Each DC source is connected to a separate group of integrity-protected (ASIL) loads. A third group of non-ASIL loads are connected to both power sources through a controllable isolator with first and second transistor arrays. The connection through the isolator also connects each ASIL group to the other DC source. With the isolator closed, power from either DC source can flow to any load. A control circuit includes a plurality of drivers for driving the first and second transistor arrays into conduction. The control circuit is configured to cease driving at least a respective one of the first and second transistor arrays when a fault condition is detected in which current flow in at least one of the transistor arrays exceeds a threshold. Thus, the ASIL loads become protected from faults occurring in the non-ASIL loads.

In one aspect of the invention, an automotive electrical system comprises a first DC power source and a second DC power source. A first group of integrity-protected loads are connected to receive power from the first DC power source. A second group of integrity-protected loads are connected to receive power from the second DC power source. A third group of quality management (QM) loads (failures which the first and second groups of integrity-protected loads are to be protected from) are connected to the power sources through a controllable isolator with first and second transistor arrays. The first transistor array is coupled between the first DC power source and the third group of QM loads, wherein the first transistor array has a closed state connecting the QM loads to receive power from the first DC power source and an open state for isolating the QM loads from the first group of integrity-protected loads. The second transistor array is coupled between the second DC power source and the third group of QM loads, wherein the second transistor array has a closed state connecting the QM loads to receive power from the second DC power source and an open state for isolating the QM loads from the second group of integrity-protected loads. A first current sensor measures a first current flow through the first transistor array. A second current sensor measures a second current flow through the second transistor array. A control circuit includes a plurality of drivers for driving the first and second transistor arrays into conduction. The control circuit is configured to cease driving at least a respective one of the first and second transistor arrays when a fault condition is detected in which the first or second current sensors measures a first or second current flow exceeding a threshold.

DETAILED DESCRIPTION OF PREFERRED EMBODIMENTS

Dual electrical power sources on an automotive vehicle can include 1) a standard 12V battery source use to power legacy-type components and/or to power a starter for a combustion engine and 2) a converted power source such as an output from a rectifier/voltage regulator of an alternator driven by a combustion engine or an output of a DC/DC converter which down-converts an output of a high voltage traction battery (e.g., typically at least 100V) to a nominal 12V. In some known vehicle architectures, the outputs of the two DC sources are both connected to a single power bus for delivering the common voltage (e.g., 12 VDC) to both ASIL loads and QM loads, whereby the loads may continue to operate if there is an interruption of one power source. The invention segregates the ASIL loads into two groups of non-QM rated-motion control systems (i.e., ASIL integrity-protected loads) for separately directly connecting each to a different one of the two electrical power sources on opposite sides of an isolator circuit, while QM-rated loads (failures which the first and second groups of integrity-protected loads are to be protected from) are grouped in the center of the isolator circuit. When the isolator circuit is closed, both QM and non-QM loads are supplied by the combination of the 12V battery system and the second DC power source (e.g., a DC/DC converter driven by a high voltage battery of an electric-propulsion vehicle or a 12V alternator in an internal combustion engine, or ICE, vehicle). If a power fault (e.g., an over-current condition or an under-voltage condition) is detected anywhere in the electrical system, the isolator circuit is opened to allow continued operation of at least half of the non-QM loads. For a fault that occurs only within the QM loads (which is the most likely scenario), all of the non-QM loads will continue to receive DC power from one of the DC sources.

Figure 1:
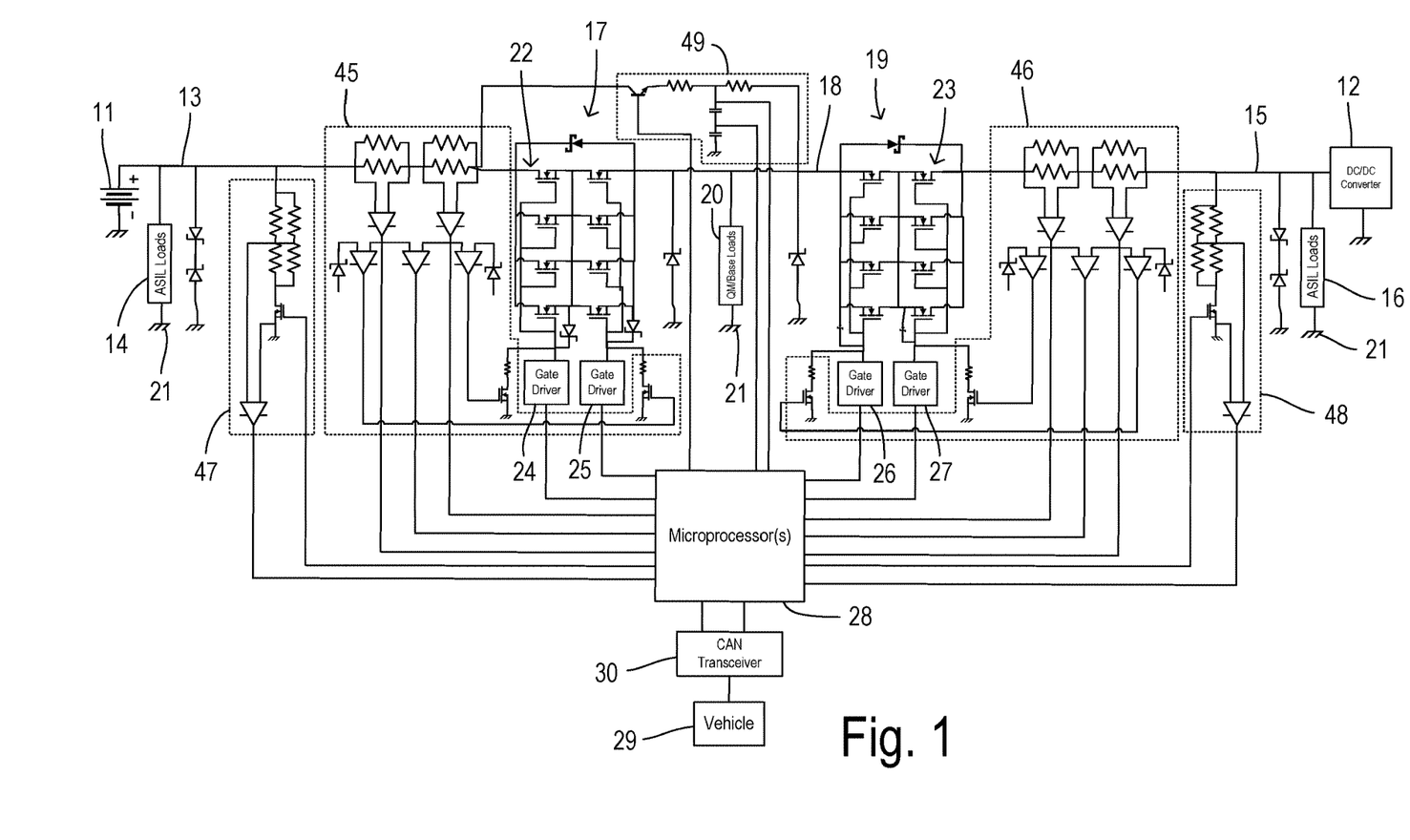
FIG. 1 is a schematic diagram showing one preferred embodiment of an automotive electrical system according to the invention.

Referring to FIG. 1, an automotive electrical system 10 includes a storage battery 11 and a DC/DC converter 12 providing a dual DC supply. Battery power (e.g., nominally 12 volts) from battery 11 is provided on a sub bus 13, and an equivalent DC voltage is provided on a sub bus 15 from converter 12. A first group of ASIL loads 14 are directly powered by battery 15 via a connection between sub bus 13 and a vehicle (chassis) ground 21. A second group of ASIL loads 16 are connected from sub bus 15 to ground 21. An isolator circuit includes an isolation switch 17 and an isolation switch 19 for selectably coupling sub buses 13 and 15 to a center sub bus 18. A plurality of QM loads 20 are connected from center sub bus 18 to ground 21.

Each isolation switch 17 and 19 includes a respective transistor array 22 and 23 which are driven by respective gate drivers 24-27 under control of a control circuit 28. Together with gate drivers 24-27, controller 28 (which may be comprised of one or more microprocessors) forms a control circuit which commands an open state or a closed state of transistor arrays 22 and 23 according to the presence or absence of fault conditions. Controller 28 may communicate with other controllers or electronic systems 29 in the vehicle via a multiplex bus 30 such as a CAN transceiver.

Figure 3:
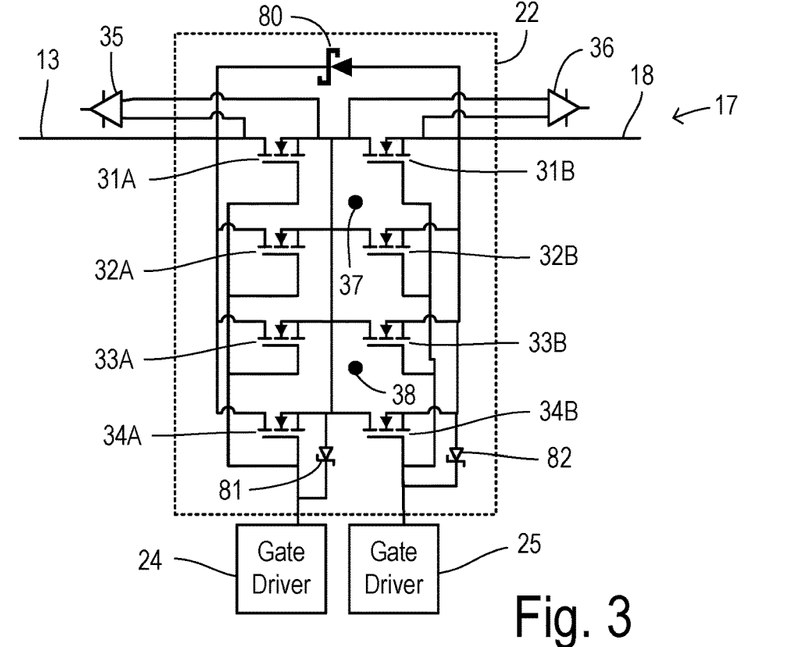
FIG. 3 is a schematic diagram showing a transistor array and drivers of FIG. 1 in greater detail.

Each transistor array 22 and 23 is comprised of a plurality of series-connected pairs of switching transistors which are connected in parallel. Each series-connected pair provides switch redundancy so that the pair can achieve an open state even if one of the pair has failed in a short circuit condition. The use of a plurality of pairs in parallel increases the overall current-carrying capability while limiting the total current and temperature generation in individual switching transistors. Preferably, the switching transistors of an isolation switch are comprised of N-channel enhancement mode MOSFETs. FIG. 3 shows transistor array 22 with a series pair of MOSFETs 31A and 31B is a source-drain configuration with their gate terminals connected to drivers 24 and 25, respectively. With no driving signal from drivers 24 and 25, MOSFETs 31A and 31B are in an open state to block current flow from sub bus 13 to sub bus 18. When drivers 24 and 25 are activated to provide a drive signal to MOSFETs 31A and 31B they switch to a closed state and connect the QM loads on sub bus 18 to receive power from the battery via sub bus 13. Series pair of MOSFETs 31A and 31B is connected in parallel with additional series pairs of MOSFETs 32A/32B, 33A/33B, and 34A/34B to provide sufficient current-carrying capacity and also provides redundancy in case any of the MOSFETs fails to an open state. The junctions between MOSFETs of each series pair are all connected together. The number of parallel MOSFET pairs can be determined using a FIT (failure in time) rate analysis, for example.

MOSFETs 31A, 32A, 33A, and 34A form a column all having their gate terminals connected to driver 24, and MOSFETs 31B, 32B, 33B, and 34B form a column all having their gate terminals connected to driver 25. Drivers 24 and 25 are commanded by the controller to produce the same gate drive signal (i.e., all MOSFETs are activated/deactivated in unison under normal conditions) but the separate control using two different gate drivers provides increased robustness against potential failure of a gate driver. In one example, a doubling of the gate drivers obtained a rate of less than 10FIT (i.e., less than 10 failures per every $10^9$ hours).

A differential amplifier 35 has inputs connected across the column of MOSFETs 31A, 32A, 33A, and 34A in order to measure a combined $R_{ds(on)}$ based on the voltage drop across the column. Likewise, a differential amplifier 36 has inputs connected across the column of MOSFETs 31B, 32B, 33B, and 34B in order to measure a combined $R_{ds(on)}$ based on the voltage drop across that column. A pair of thermistors 37 and 38 are located close to the MOSFETs to monitor temperature of portions of array 22. The outputs of differential amplifiers 35 and 36 and thermistors 37 and 38 are coupled to the controller in order to perform diagnostics to determine whether any particular MOSFET has failed or may be approaching a failure.

In the source-drain configuration of FIG. 3, the inherent body diodes of each of the MOSFETs (pointing from the drain to the source terminals) are conductive in the direction from center sub bus 18 to first power supply bus 13. In FIG. 1, the body diodes of the MOSFETs in transistor array 23 are conductive in the direction from center sub bus 18 to second power supply bus 15. Thus, when the MOSFETs of one transistor array are placed in an open state by a cessation of the corresponding gate drive signals in the attempt to block current from the respective DC source, current flow in the opposite direction (i.e., from the opposite DC source via center sub bus 18) would not be blocked. Therefore, both isolation switches 17 and 19 are opened simultaneously in response to any detected fault condition. Otherwise, if a short circuit fault would be detected at a terminal of battery 11 or in any of ASIL loads 14 that shorts sub bus 13 to ground, and if isolation switch 17 was opened and isolation switch 19 remained closed, then current from converter 12 would be able to flow into the short circuit via the body diodes in transistor array 22. Therefore, in response to a fault condition using the isolation circuit as shown in FIG. 1, both transistor arrays 22 and 23 are switched to their opened states, which results in isolating all three groups of loads 14, 16, and 20 from one another. If the fault condition occurs in one of the QM loads 20, then ASIL loads 14 and 16 are protected from the fault and they continue to receive DC power from DC sources 11 and 12, respectively. If the fault condition occurs at one of the DC sources, then when both isolation switches 17 and 19 are opened both the ASIL loads directly exposed to the fault and QM loads 20 are disconnected from DC power while the remaining group of ASIL loads still receives DC power from the non-faulted DC source.

A Schottky diode 80 is connected across MOSFET array 22 in parallel with the body diodes because of the limited current carrying capability of the body diodes. Thus, if there is current flow through array 22 when it is in the opened state then diode 80 will conduct instead of the body diodes to protect the MOSFETs from damaging current levels. Zener diodes 81 and 82 are provided at the outputs of gate drivers 24 and 25 to clamp the gate driver voltages to tolerable levels in case the drivers become faulted with an overvoltage at their output that could damage a MOSFET.

Figure 2:
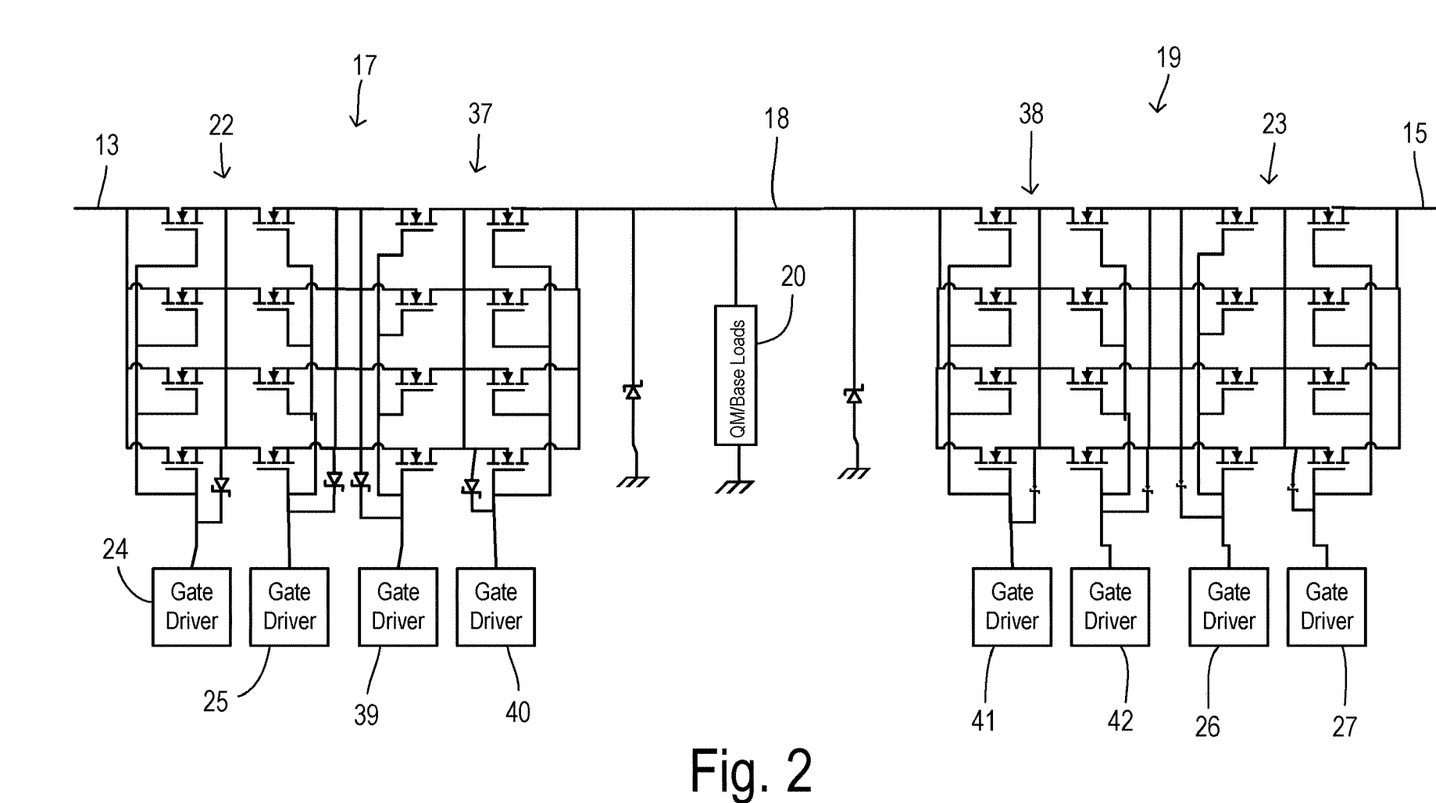
FIG. 2 is a schematic diagram showing transistor arrays according to an alternative embodiment.

FIG. 2 shows a modification of a portion of the circuit of FIG. 1 which adds bidirectional blocking to each of the isolation switches which can allow one isolation switch to remain closed when the other isolation switch is opened to isolate a fault at one of the DC source busses. In first isolation switch 17, a transistor array 37 is placed in series with transistor array 22. Transistor array 37 includes series pairs of N-channel enhancement mode MOSFETs with rows and columns similar to transistor array 22 except that the MOSFETs in array 37 are connected in a common source configuration. Gate drivers 39 and 40 are connected to the gate terminals in respective columns of MOSFETs in array 37, and gate drivers 41 and 42 are connected to the gate terminals in respective columns of MOSFETs in array 38. The body diodes of the MOSFETs in array 37 are in opposition to the body diodes of the MOSFETS in array 22. Therefore, when the gate drivers cease driving the MOSFETs in arrays 22 and 37, current is blocked in both directions. When a fault condition arises for one of the DC sources or one group of ASIL loads, it is only necessary to open the respective isolation switch (comprised of MOSFET arrays in both the source-drain configuration and common source configuration) to isolate the fault, thereby allowing the QM loads and the other group of ASIL loads to operate off of the remaining DC source. Thus, while all the gate drive signals from the gate drivers of one isolation switch all have the same On or Off level at any one time, the gate drive signals of the two isolation switches may not be the same.

Detection of fault conditions in the present invention can include detection of current faults (e.g., a short circuit causing excessive current flow) and/or voltage faults (e.g., voltage mismatches that could cause large inrush currents when closing the isolation switches). As shown in FIG. 1, current faults are detected using current sensing circuits 45 and 46, and voltage faults are detected using voltage sensing circuits 47 and 48, for each respective side of the isolation circuit. Current sensing circuits 45 and 46 are substantially identical, as are voltage sensing circuits 47 and 48.

Figure 4:
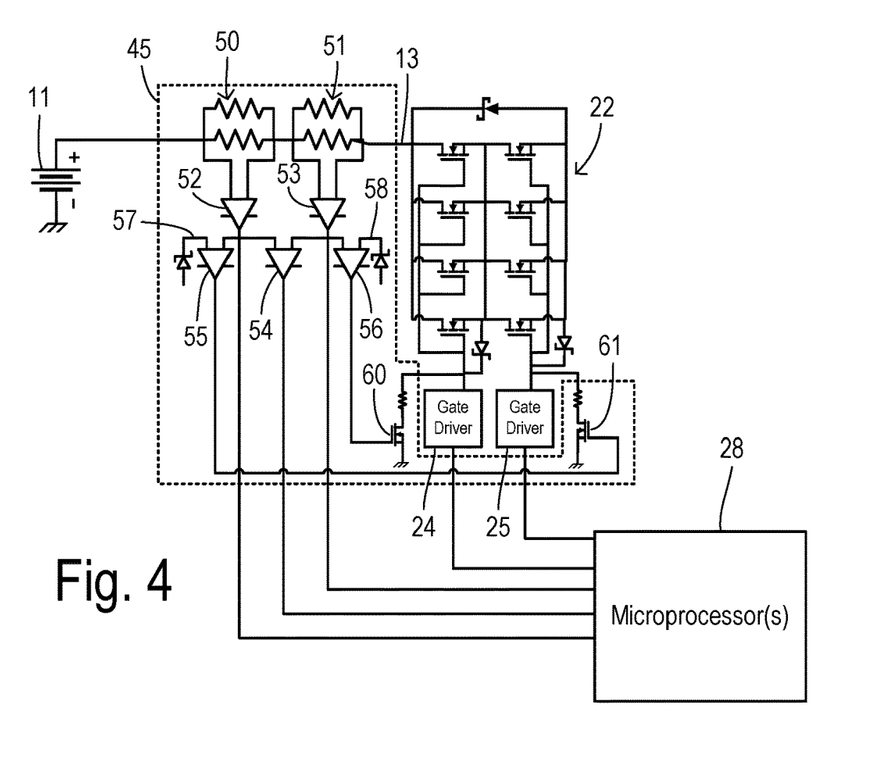
FIG. 4 is a schematic diagram showing a current measuring portion of FIG. 1 in greater detail.

Current sensing circuit 45 is shown in greater detail in FIG. 4. Two resistor shunts 50 and 51 are connected in series on sub bus 13. Differential amplifiers 52 and 53 determine a voltage drop across each shunt 50 and 51, respectively, to measure a current flow. Each shunt 50 and 51 includes a pair of parallel shunt resistors to add circuit robustness and aid in diagnostics in the event a shunt resistor fails (e.g., if a shunt resistor fails then the current measured by the differential amplifier for one shunt would be twice the current measured by the other differential amplifier even though the currents should be equal). The outputs of differential amplifiers 50 and 51 are compared by a difference amplifier 54 to determine a level of measurement error between the current shunts. The output of difference amplifier 54 is provided to controller 28 where it can be compared to an error threshold, and if the error threshold is exceeded then a fault notification may be sent to a user or to a master controller in the host vehicle.

The outputs of differential amplifiers 50 and 51 are also coupled to respective inputs of comparators 55 and 56 for comparison to trigger levels set by reference signals 57 and 58 which define an overcurrent fault condition. Outputs of comparators 55 and 56 are connected to the gate terminals of MOSFETs 60 and 61 which have their outputs coupled between ground and the respective outputs of gate drivers 24 and 25. If an overcurrent fault in indicated by either comparator 55 or 56 (e.g., the output(s) of comparator 55 or 56 go high), then MOSFETs 60 and/or 61 are activated to pull the output(s) of gate drivers 24 and/or 25 to ground, thereby forcing both columns of MOSFETs in transistor array 22 to go to an open state. Comparators 55 and 56 are latched in the state with their outputs high, so that the isolation switch remains off until the DC power sources are cycled off/on or a reset command is initiated by a vehicle host.

Figure 5:
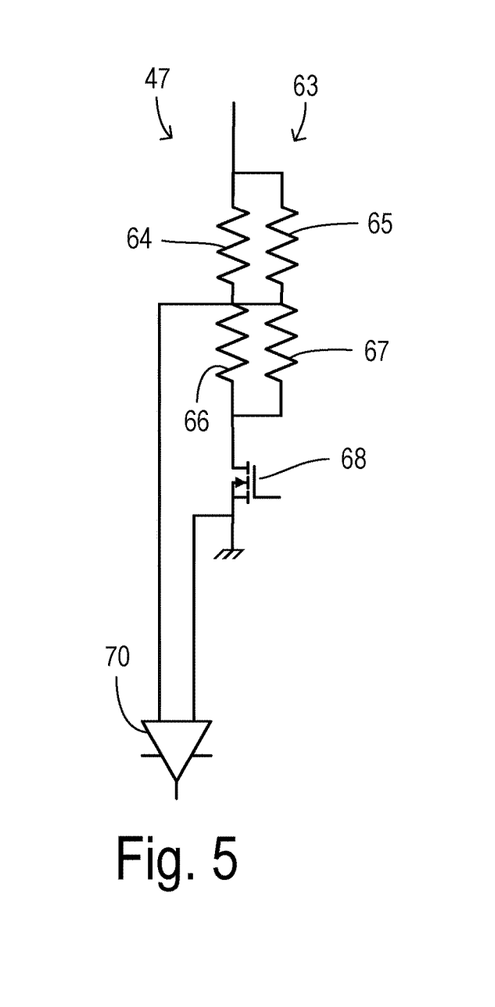
FIG. 5 is a schematic diagram showing a voltage measuring portion of FIG. 1 in greater detail.

Voltage sensing circuit 47 is shown in greater detail in FIG. 5. A resistor divider 63 having resistors 64-67 is used to generate a scaled version of the DC voltage on sub bus 13. Resistors 64-67 are arranged in a way that also enables detection of the condition of resistor divider 63 as an aid in fault diagnostics. Resistors 64-67 are also sized in such a way (using lower than typically used values) to obtain fast transient measurements with high resolution and accuracy. In order to reduce Key-Off-Load effects (e.g., excessive drain on the 12V battery) due to the low resistance of resistor divider 63, a sampling switch 68 is added in series with resistor divider 63. Sampling switch 68 is turned on by controller 28 when a voltage measurement is required and then is turned off when not in use. A differential amplifier 70 is used to read the voltage across resistors 66 and 67 and to send the measured value to controller 28 when sampling switch 68 is turned on. Measured voltages for both sides of the isolator circuit may be used by controller 28 for diagnostic switch equalization. In switch equalization, the voltage at both ends of the isolator must be substantially equal (e.g., a difference between the voltages cannot be greater than a predetermined difference) prior to allowing the isolation switches to close from an opened state. This equalization requirement reduces the possible large inrush currents that could flow through the MOSFETs if the differential voltage across the isolator was too high.

Figure 6:
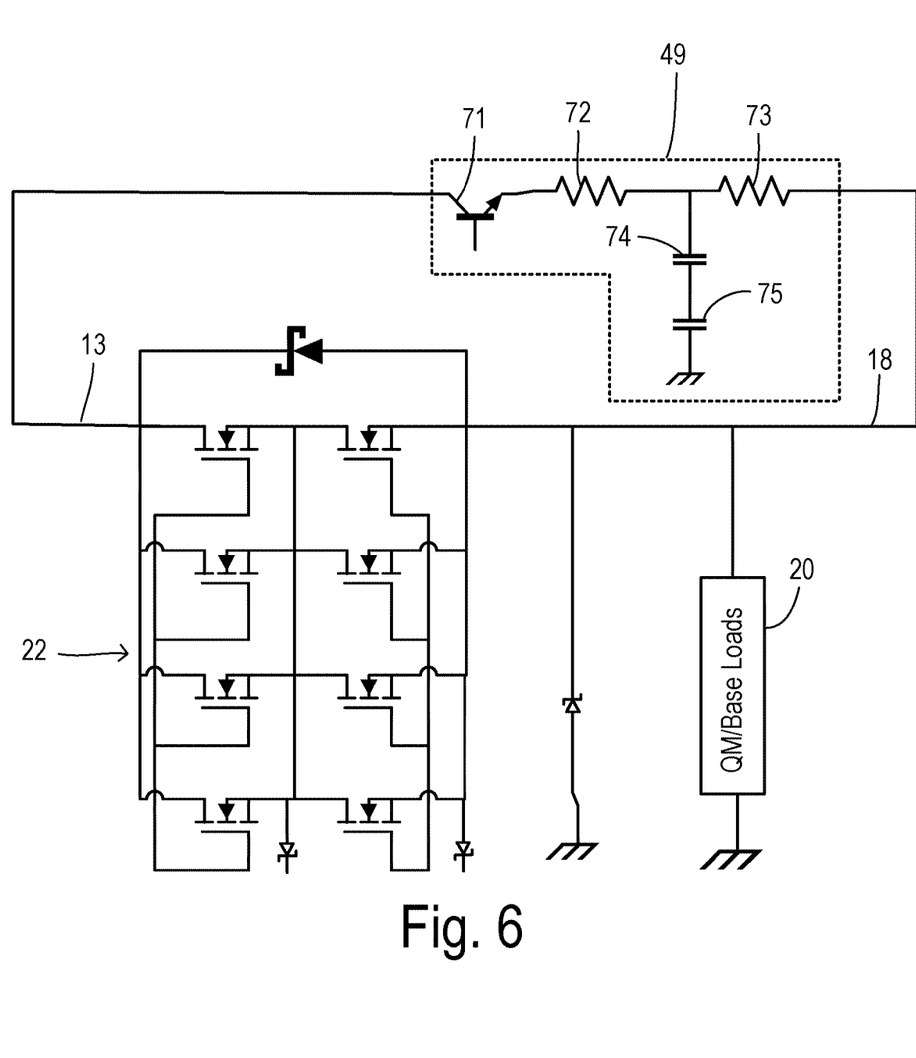
FIG. 6 is a schematic diagram showing a short-circuit verification circuit of FIG. 1 in greater detail.

The circuit in FIG. 1 further shows a short-circuit verification circuit 49 which is shown in greater detail in FIG. 6. After an overcurrent fault condition has been detected, all MOSFETs in transistor arrays 22 and 23 will be in an opened state since the gate drivers will have ceased driving the MOSFETs into conduction. After the overcurrent condition has passed, a method for determining if the isolation switches can be closed again would be desirable. Voltage measurements from sensing circuits 47 and 48 can be used to determine if the short circuit still exists, provided the originally detected short circuit existed at one of the outer ends of the isolator. For QM loads 20 that are connected to center sub bus 18 of the isolator, only a low or floating voltage would be available during the opened state of the isolator. Therefore, a separate circuit is needed to determine the condition of sub bus 18.

Short-circuit verification circuit 49 includes a charging switch 71 (e.g., a bipolar transistor) connected between sub bus 13 and one side of a resistor 72. The other side of resistor 72 is coupled to ground through a capacitance comprised of series capacitors 74 and 75. The junction between resistor 72 and capacitor 74 is coupled to center sub bus 18 by a resistor 73. When the isolation switch is in an opened state and it is desired to check whether a short-circuit fault still exists within QM loads 20, then charging switch 71 is turned on (e.g., the controller provides a drive signal to the control terminal of switch 71). This results in capacitors 74 and 75 being charged through resistor 72. After a predetermined period of time, charging switch 71 is turned off which allows current from capacitors 74/75 to feed sub bus 18 through resistor 73. Voltage across capacitors 74/75 are monitored by the controller (via a connection which is not shown). If a short circuit still exists that affects sub bus 18, then the controller will read a decreasing voltage across capacitors 74/75. The isolation switches will not close (i.e., will remain open) in this condition. If the voltage across capacitors 74/75 remains substantially constant for a predetermined time interval, a short circuit is not present and the isolation switches can be allowed to close.

What is claimed is:

1. An automotive electrical system comprising:
   a first DC power source;
   a second DC power source;
   a first group of integrity-protected loads connected to receive power from the first DC power source;
   a second group of integrity-protected loads connected to receive power from the second DC power source;
   a third group of quality management (QM) loads, failures which of the first and second groups of integrity-protected loads are to be protected from;
   a first transistor array coupled between the first DC power source and the third group of QM loads, wherein the first transistor array has a closed state connecting the third group of QM loads to receive power from the first DC power source and an open state for isolating the third group of QM loads from the first group of integrity-protected loads;
   a second transistor array coupled between the second DC power source and the third group of QM loads, wherein the second transistor array has a closed state connecting the third group of QM loads to receive power from the second DC power source and an open state for isolating the third group of QM loads from the second group of integrity-protected loads;
   a first current sensor measuring a first current flow through the first transistor array;
   a second current sensor measuring a second current flow through the second transistor array; and
   a control circuit including a plurality of drivers for driving the first and second transistor arrays into conduction, wherein the control circuit is configured to cease driving at least a respective one of the first and second transistor arrays when a fault condition is detected in which the first or second current flow exceeds a threshold.

2. The system of claim 1 wherein the first and second transistor arrays are each comprised of a plurality of MOSFETs.

3. The system of claim 2 wherein the MOSFETs in each array include a plurality of series-connected pairs which are connected in parallel.

4. The system of claim 3 wherein the control circuit includes four drivers, wherein a first pair of drivers is connected to the first transistor array and a second pair of drivers is connected to the second transistor array, and wherein one driver of each pair is connected to one of the MOSFETs in a respective series-connected pair and the other driver of each pair is connected to the other one of the MOSFETs in a respective series-connected pair.

5. The system of claim 1 wherein the first and second transistor arrays function as unidirectional isolation switches, and wherein when either one of the first and second current flows exceeds the threshold then the control circuit ceases driving both of the first and second transistor arrays, thereby mutually isolating the first, second, and third groups of loads.

6. The system of claim 1 wherein the first and second transistor arrays are each comprised of a plurality of MOSFETs functioning as a unidirectional isolation switch, wherein the system further comprises:
   a third transistor array coupled between the first DC power source and the third group of QM loads, wherein the third transistor array is comprised of a plurality of MOSFETs functioning as a unidirectional isolation switch having a polarity opposite of the first transistor array; and
   a fourth transistor array coupled between the second DC power source and the third group of QM loads, wherein the fourth transistor array is comprised of a plurality of MOSFETs functioning as a unidirectional isolation switch having a polarity opposite of the second transistor array;
   wherein the control circuit further includes a plurality of drivers for driving the third transistor array into an open state or a closed state equivalent to the first transistor array, and wherein the control circuit further includes a plurality of drivers for driving the fourth transistor array into an open state or a closed state equivalent to the second transistor array; and
   wherein the control circuit is configured to cease driving only the combined first and third transistor arrays when the fault condition is detected in which the first current flow exceeds the threshold, and wherein the control circuit is configured to cease driving only the combined second and fourth transistor arrays when the fault condition is detected in which the second current flow exceeds the threshold.

7. The system of claim 1 further comprising:
   a first voltage sensing circuit coupled to the first DC power source;
   a second voltage sensing circuit coupled to the second DC power source;
   wherein the control circuit is coupled to the first and second voltage sensing circuits for measuring a first DC voltage and a second DC voltage, respectively, and wherein the control circuit inhibits initiation of driving the first and second transistor arrays into conduction if a difference between the first and second DC voltages is greater than a predetermined difference.

8. The system of claim 7 wherein the first and second voltage sensing circuits are each comprised of a switched resistor divider.

9. The system of claim 7 further comprising a short-circuit verification circuit comprised of:
   a charging switch having an input connected to one of the first DC power source or the second DC power source; and
   a capacitance connected between an output of the charging switch and a ground side of the third group of loads;
   wherein the charging switch has a control terminal coupled to the control circuit, and wherein the control circuit activates the control terminal during times that the control circuit ceases driving the first and second transistor arrays; and wherein the control circuit is configured to measure a voltage across the capacitance after the control terminal has been activated, and wherein the control circuit restores driving the first and second transistor arrays if the measured voltage remains substantially constant during a predetermined time interval.

10. An automotive electrical system comprising:
a first DC power source comprised of a first battery;
a second DC power source comprised of a DC converter;
a first group of integrity-protected loads connected to receive power from the first DC power source;
a second group of integrity-protected loads connected to receive power from the second DC power source;
a third group of quality management (QM) loads, failures which of the first and second groups of integrity-protected loads are to be protected from;
a first transistor array coupled between the first DC power source and the third group of QM loads, wherein the first transistor array has a closed state connecting the third group of QM loads to receive power from the first DC power source and an open state for isolating the third group of QM loads from the first group of integrity-protected loads;
a second transistor array coupled between the second DC power source and the third group of QM loads, wherein the second transistor array has a closed state connecting the third group of QM loads to receive power from the second DC power source and an open state for isolating the third group of QM loads from the second group of integrity-protected loads;
a first current sensor measuring a first current flow through the first transistor array;
a second current sensor measuring a second current flow through the second transistor array; and
a control circuit including a plurality of drivers for driving the first and second transistor arrays into conduction in the closed state, wherein the control circuit is configured to cease driving at least a respective one of the first and second transistor arrays when a fault condition is detected in which the first or second current flow exceeds a threshold.

11. The system of claim 10 further comprising a traction battery having a voltage of at least 100V, wherein the DC converter converts the voltage of the traction battery to a voltage of the first battery.

12. The system of claim 10 further comprising an alternator configured to be driven by an internal combustion engine, wherein the DC converter converts an electrical output of the alternator to a voltage of the first battery.

* * * * *